July 19, 1932.  B. RUBIN  1,868,178
FASTENING DEVICE
Filed June 27, 1929  2 Sheets-Sheet 1
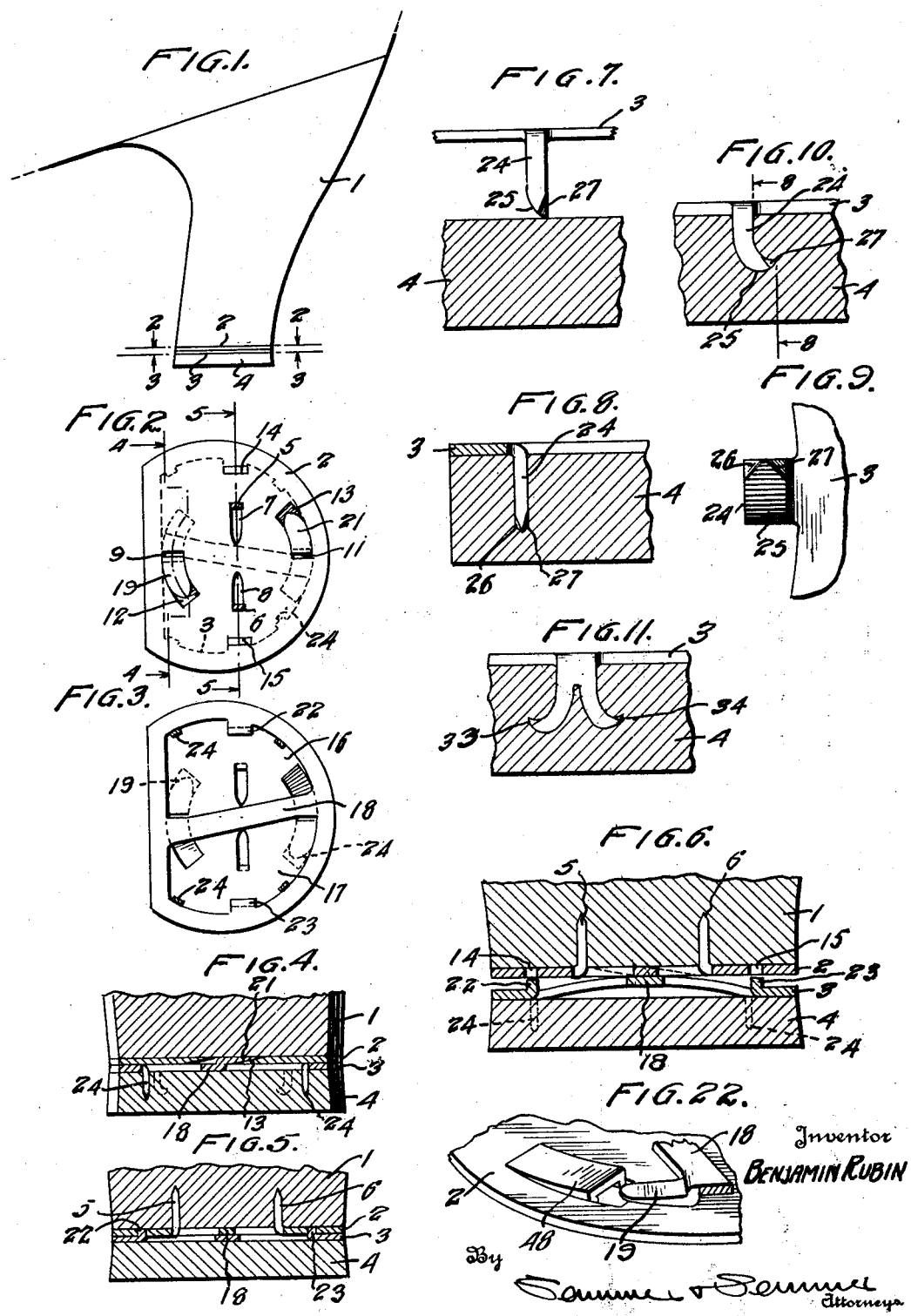

July 19, 1932. B. RUBIN 1,868,178
FASTENING DEVICE
Filed June 27, 1929  2 Sheets-Sheet 2
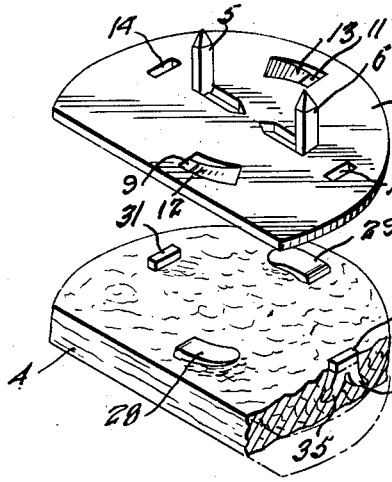
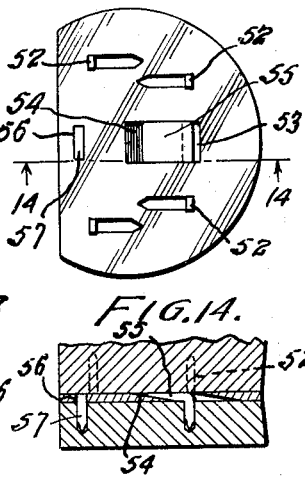
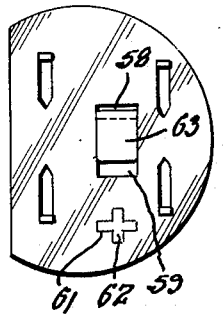
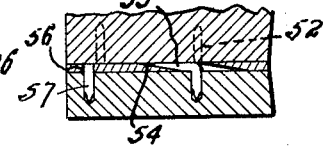
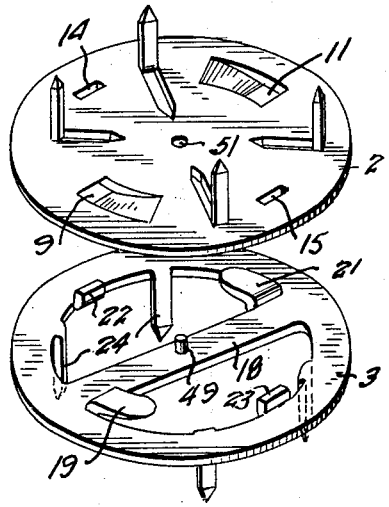
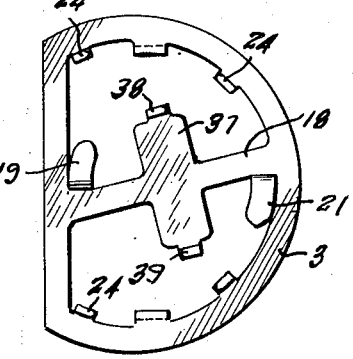
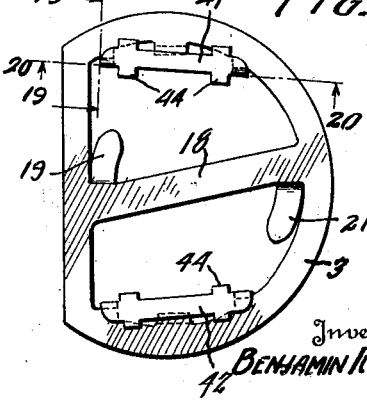
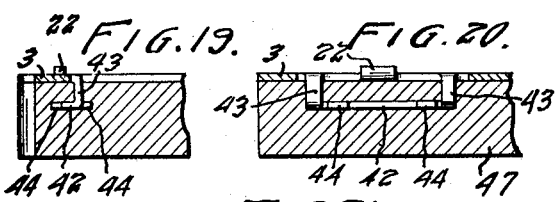
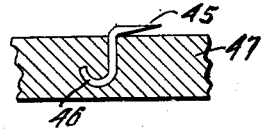
Inventor
BENJAMIN RUBIN Patented July 19, 1932

1,868,178

UNITED STATES PATENT OFFICE

BENJAMIN RUBIN, OF PHILADELPHIA, PENNSYLVANIA, ASSIGNOR, BY DIRECT AND MESNE ASSIGNMENTS, TO RUBIN PATENTS CORPORATION, A CORPORATION OF DELAWARE

FASTENING DEVICE

Application filed June 27, 1929. Serial No. 374,197.

This application is a continuation in part of my copending application, Serial No. 299,404, for detachable tread member, filed August 13, 1928.

This invention relates in general to attaching devices and more particularly has reference to a fastening arrangement for securing treads on shoe heels.

Previous to this time the various devices employed for attaching treads on heels have not afforded as secure a union as is desirable and necessary in articles of this character. It will be apparent that a loose connection may cause discomfort to the wearer while the loss of a tread under certain conditions may be attended with disastrous consequences.

If a tread is loosely fitted on a heel, moisture and other foreign material is allowed to enter and collect which ultimately may cause irreparable damage to a heel and tread. Also where a tread is insecurely attached it may be easily pulled loose on catching in some obstruction and cause the wearer to fall, thus often precipitating bodily injury.

The numerous attachments provided in the past have usually included movable members or spring operated catches to secure a tread in place on a heel. These devices are obviously subject to strains over long continued periods of use which either causes the movable members to become dislodged or the catches to spring so as to negative the effectiveness of the same.

An object of this invention is to provide an attachment device in which a rigid wedging action is obtained between corresponding members.

Another object of this invention is to provide an attachment device in which a rigid wedging action with a spring effect is obtained between corresponding members.

Another object of this invention is to provide an attachment device in which a rigid wedging action with a spring effect is obtained between corresponding members which are automatically locked in position.

Still another object of this invention is to provide a device for attaching a tread to a shoe heel embodying a rigid structure.

A further object of this invention is to provide a device for attaching a tread to a shoe heel embodying a rigid structure with a spring effect.

A still further object of this invention is to provide a device for attaching a tread to a shoe heel embodying a rigid structure with a spring effect which is automatically locked in position when attached.

With these and other objects in view which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claim.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings forming a part of the specification:

Figure 1 is a side elevational view of a conventional shoe heel showing a tread member mounted thereon by the attachment device forming the subject matter of this invention.

Figure 2 is a top view of the plate fixed to the heel, taken on line 2—2 of Figure 1, showing the plate fixed to the tread in the plan.

Figure 3 is a bottom view of the plate fixed to the tread, taken on line 3—3 of Figure 1, showing the plate fixed to the heel in the plan.

Figure 4 is a sectional view taken on line 4—4 of Figure 2.

Figure 5 is a sectional view taken on line 5—5 of Figure 2.

Figure 6 is a sectional view showing the manner of detaching the corresponding plates forming the device.

Figure 7 is a side view of the preferred form of nail formed on the bottom plate, shown prior to being driven in a tread member.

Figure 8 is a front view of the nail subsequent to being driven in a tread member.

Figure 9 is a bottom view of the nail prior to being driven.

Figure 10 is a side view of the nail subsequent to being driven.

Figure 11 is a side view of a split nail of the character of the nail shown in Figures 7 through 10, subsequent to being driven.

Figure 12 is a perspective view of a modified form of the invention in which separate tongues and projections are substituted for those normally carried by the lower plate.

Figure 13 is a top view of a modified form of plate.

Figure 14 is a sectional view taken on line 14—14 of Figure 13.

Figure 15 is a top view of another modified form of plate.

Figure 16 is a perspective view of a modified form of attachment device adaptable for other usages.

Figure 17 is a bottom view of a modified form of bottom plate.

Figure 18 is a top view of a bottom plate for use in connection with rubber heels.

Figure 19 is a sectional view taken on line 19—19 of Figure 18.

Figure 20 is a sectional view taken on line 20—20 of Figure 18.

Figure 21 is a sectional view showing a separate tongue fixed in a rubber heel.

Figure 22 is a perspective view of a modified form of attachment device.

Referring more particularly by numerals to the drawings, in which the same and similar elements are designated by like symbols of reference throughout, and more particularly to Figure 1, there is shown a heel 1 suitably attached at the top of the bottom sole of a conventional shoe of a feminine character. A plate 2 is mounted on the bottom of the heel and a plate 3 carrying a tread member 4 is attached thereto. The plate 2, as shown in Figure 2, is of the same configuration as the bottom of the heel and is provided with a plurality of securing members 5 and 6 integrally formed therewith, the same being stamped from the plate as indicated at 7 and 8. The members 5 and 6 are adapted to be driven into the bottom of the heel to secure the plate thereon. It is manifest, however, that ordinary screws or nails may be substituted for the members 5 and 6 if found desirable.

A plurality of slots 9 and 11 opening into curved tapered grooves 12 and 13 are formed on opposite sides of the plate, the curve of the grooves conforming with the circumference of a circle having a diameter equal to the distance between the slots. The grooves 12 and 13 terminate at the ends opposite the slots 9 and 11, flush with the top surface of the plate, opening into the slots substantially flush with the bottom of the plate. The slots 9 and 11 are oppositely disposed in longitudinal alignment on the plate, with the grooves 12 and 13 extending in opposite directions. Oppositely disposed longitudinally extending slots 14 and 15 are formed on the sides of the plate, transversely with respect to the slots 9 and 11.

The plate 3, as shown in Figure 3, is cut away on each side of the center as at 16 and 17, the front and rear portions remaining connected by a cross member 18. A plurality of tongues 19 and 21 are formed on opposite sides of the cross member 18 adjacent the ends thereof. The tongues 19 and 21 are tapered towards the ends and curved in conformation with the circumference of a circle having a diameter equal to the distance between the same, similar to the grooves 12 and 13 in the plate 2, the tongues being adapted for engagement with the slots 9 and 11.

A plurality of projections 22 and 23 are formed on the sides of the inner rim of the cut away portions 16 and 17, the same being bent upwardly. The projections 22 and 23, longitudinally extending and oppositely disposed in transverse alignment, are intended for engagement with the slots 14 and 15 in the plate 2.

A plurality of projections 24, bent downwardly to form nails, are provided around the edges of the cut away portions 16 and 17. The nails, better illustrated in Figures 7 and 8, are tapered on one side as shown at 25 so as to bend on being driven, and tapered on the opposite edges as at 26 and 27 to facilitate driving.

In applying the attachment device to a shoe, the plate 2 is placed on the bottom of a heel such as 1, shown in Figure 1, and affixed thereto by driving in the securing members 5 and 6, which may be of the character of the nail described in Figures 7 and 9. As has already been pointed out, the securing members may be dispensed with and nails, screws or other devices employed in attaching same.

The plate 3 is adapted to be mounted on a tread member such as 4 and fixedly secured thereon by driving in the nails 24, formed thereon. The entry of the nails 24 into the tread member will be facilitated by reason of the tapered portions 26 and 27, and on being driven will curve so as to form a hook, as shown in Figure 10, by reason of the tapered portion 25. The front of the nail, however, will remain straight, as shown in Figure 8, without any provision for deflecting the same from its normal path.

In this connection, however, it is manifest that the nail may be tapered in addition, or the tapering shown may be modified, so as to drive the nail in any desired direction to obtain the holding effect found most suitable. Also, the integrally formed nails 24 may be dispensed with and the plate attached to the tread member in any other desirable manner.

After the plates 2 and 3 have been mounted on the bottom of a heel and the top of a tread member, respectively, the same may be connected so as to attach the tread to the heel by inserting the tongues 19 and 21 carried on bottom plate 3, in the slots 9 and 11 formed in the plate 2, whereupon the tongues may be rotated so as to engage the grooves 12 and 13, as shown in Figure 4. Inasmuch as the grooves and tongues are oppositely tapered, it will be apparent that a firm wedging action will be secured between the same and the tread thus firmly attached to the heel.

After the tongues have been rotated to the full extent, the projections 22 and 23 formed on the plate 3 engage the slots 14 and 15 in the plate 2, as shown in Figure 5, thus preventing rotation of the tongues in either direction with respect to the grooves, and locking the plates together. It will be particularly noted that the thickness of the attachment device is no more than that of the juxtaposed plates, that is, the tongues 19 and 21 and projections 22 and 23 are self-contained and do not stand above or below the surface of the respective plates.

It will be appreciated that as the plates are preferably formed of any suitable metal such as brass, a rigid structure is afforded. In this connection, however, it is to be pointed out that a spring effect exists in the plate 3 in attaching or detaching the device, so that it is not required that the tread member flex.

When it is desired to disengage the plate so as to remove the tread member, the edges of the same are grasped on the side adjacent the projections 22 and 23 and the same pulled outwardly so as to disengage the projections from the slots 14 and 15. As is depicted in Figure 6, it will be seen that this operation will not necessarily cause a flexing of the tread member, but will spring the edges of the plate down from the center, allowing disengagement of the projections 22 and 23 without bending the tread member.

When interengaged, it will be appreciated that a close connection will be afforded between the respective plates serving to firmly retain the tread in place and prevent the entrance of moisture or other foreign material.

In addition to the spring effect residing in the bottom plate 3, it will likewise be appreciated that the tongues 19 and 21 possess some degree of resiliency, so as to insure a constant wedging action between the plates.

It will be apparent that the invention is subject to numerous modifications. For example, there is illustrated in Figure 12 the plate 2 shown in Figure 2, but separate elements are substituted on the tread member for the tongues 19 and 21 and the projections 14 and 15 carried by the plate 3. A plurality of tongues 28 and 29 are separately fixed in the top of the tread member 4 in the same relation as the tongues 19 and 21 carried by the plate 3. Similarly, projections 31 and 32 are embedded in the tread member.

The tongues and projections may be provided with integrally formed nails of the character shown in Figures 7 through 9, or a split nail of the character shown in Figure 11 may be used. This nail is similar to that already described, except that it embodies a plurality of integrally formed nails 33 and 34, oppositely formed, and tapered in a manner already described. The projection 32 shown in Figure 12 is formed with a split nail of this character, which will spread in opposite directions on being driven, so as to provide a plurality of hooks 35 and 36. It will thus be seen that the plate 3 may be dispensed with and separate securing and locking elements substituted for those normally carried by the plate, if found desirable.

In Figure 17, the bottom plate 3 is shown with an integral crosspiece 37 transversely positioned with respect to the piece 18. The ends of the crosspiece 37 are provided with downwardly extending nails 38 and 39 to secure the plate on a tread member, in addition to the nails 24. This construction is particularly adaptable to large tread members of the character employed on men's shoes, where the additional surface makes it necessary to secure the plate in the center as well as upon the sides.

In Figure 18 is shown a modification of the securing members 24 for use in conjunction with rubber heels. In this construction the nails 24 are dispensed with and a plurality of cross members 41 and 42 substituted therefor.

The cross members are integrally formed with the plate, being suspended on connecting arms 43 bent downwardly from the plate. The arms 42 are provided with integral transverse projections 44 to aid in securing the arms in a rubber tread and thus afford a firm mounting of the plate thereon. In this construction the arms are embedded in the raw rubber previous to vulcanizing and the tread formed with the arms embedded therein.

If it is desired to dispense with the plate 3 in the mounting of a rubber tread, the securing and locking members may be separately embedded therein, as described in connection with Figure 12, by a construction of the character of that shown in Figure 21. An individual tongue member 45 is provided with a downwardly extending hook 46 which it is intended be vulcanized on the rubber when the tread, such as 47, is formed.

It is manifest that the securing members described in connection with Figures 18 through 21 are subject to numerous modifications, and the particular forms described are merely set forth as illustrative of a character of members that may be employed, although the invention is in no wise restricted to the use of these particular constructions.

In Figure 22 is shown a modified form of groove in which the same is stamped above the surface of the plate 2, as at 48. In this construction, the tongue will likewise fit flush with the bottom of the plate 2 so that the thickness of the device is the same as that of the juxtaposed plates, neither the securing or locking members extending above or below the outer surfaces thereof.

This construction will be found desirable where particularly thin plates are employed, to afford a more positive wedging action, as otherwise the desired inclination of the grooves could not be obtained.

It will be manifest that the device is susceptible to a wide usage on articles other than shoes, and in Figure 16 is shown a type of construction adaptable to other articles. In this construction the plates are round in shape, for securing such articles as treads on crutches or fastening rugs to a floor. It is apparent, however, that the device may be shaped in any suitable manner to meet the particular requirements. In this construction, the cross member 18 carried by the plate 3 is provided with an upwardly projecting pin 49, located in the center thereof, and the plate 2 provided with a corresponding aperture 51. The pin engaging the aperture is intended to center the plates so as to facilitate insertion of the tongues 19 and 21 in the corresponding slots 9 and 11. It will of course be understood that a similar arrangement may be incorporated in any of the several constructions hereinbefore described, if found desirable.

In Figures 13 through 15 are illustrated modified forms of plates in which longitudinal and transverse movement for attaching and detaching is substituted for the rotational movement already described. In these constructions, the plates are provided with securing members 52 similar to those indicated by the numerals 5 and 6, shown in Figure 12.

The upper plate shown in Figure 13 is provided with a transverse slot 53 and a longitudinal tapered groove 54 opening therein adapted to be engaged by a corresponding tongue 55 carried by a bottom plate, or separately fixed in a tread member, and a slot 56 adapted to receive a projection of the character of 22 or 23, shown in Figure 3, or 31 depicted in Figure 12. In attaching a tread member on a heel, the tongue 55 is inserted in the slot 53 and the plate pushed to the rear so that the tongue is caused to engage the groove and effect a wedge fit therewith, the same being locked in position by engagement of the projection 57 with the slot 56. In the construction shown in Figure 15, the plate is provided with a longitudinal slot 58 and a transverse tapered groove 59 opening therein. Also, a crossed slot 61 is substituted for the slot 56 shown in Figure 13, adapted to be engaged by a cross projection 62 carried either by the under plate or separately mounted on a tread member.

Attachment of a tread member on a heel employing this device is effected by inserting a tongue 63, either carried by an under plate or separately mounted on the tread member, in the slot 58 and moving the plate against the tongue until fully engaging with the groove 59 and the same locked in position by engagement of the cross projection 62 with the crossed slot 61. In either arrangement the plates may be detached by disengaging the projections from the slots and sliding the tongues from the grooves.

It will of course be manifest that, while only single securing and locking members have been shown, any desired number may be employed, and that the same may be arranged on the plates in a different manner from that shown.

There is accomplished by this invention an attachment in which a rigid wedging action with a spring effect is obtained by the corresponding members which are automatically locked in position, affording a secure and lasting union which may be easily detached.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claim.

I claim:

A fastening device comprising a plurality of plates, one of the plates having slots opening in grooves having a tapering space between the bottom of the grooves and the top of the plate therein, the other plate carrying tongues with their underlying faces tapered adapted to project through said slots to engage the space between the bottom of the groove and the top of the plate to effect a wedging engagement, said slots, grooves and the tongues being so arranged as to be brought into wedging engagement by rotation of one of the plates.

In testimony whereof I affix my signature.

BENJAMIN RUBIN.